(12) United States Patent
Kloepple et al.

(10) Patent No.: US 11,156,343 B1
(45) Date of Patent: Oct. 26, 2021

(54) LIGHT FIXTURE ASSEMBLY AND RELEASABLE FASTENER THEREFOR

(71) Applicant: SLP LIGHTING, LLC, Fenton, MO (US)

(72) Inventors: Robert Kloepple, Saint Louis, MO (US); John Campbell, Saint Louis, MO (US)

(73) Assignee: SLP LIGHTING, LLC, Fenton, MO (US)

( * ) Notice: Subject to any disclaimer, the term of this patent is extended or adjusted under 35 U.S.C. 154(b) by 0 days.

(21) Appl. No.: 16/518,318

(22) Filed: Jul. 22, 2019

(51) Int. Cl.
| | |
|---|---|
| *F21V 17/16* | (2006.01) |
| *F21V 17/10* | (2006.01) |
| *F21S 8/02* | (2006.01) |
| *F16B 21/06* | (2006.01) |
| *F21V 21/08* | (2006.01) |
| *F21Y 115/10* | (2016.01) |

(52) U.S. Cl.
CPC ............ *F21V 17/10* (2013.01); *F16B 21/065* (2013.01); *F21S 8/02* (2013.01); *F21V 17/16* (2013.01); *F21V 21/08* (2013.01); *F21Y 2115/10* (2016.08)

(58) Field of Classification Search
CPC .............................................. F21V 17/16–168
See application file for complete search history.

(56) References Cited

U.S. PATENT DOCUMENTS

| | | | |
|---|---|---|---|
| 2011/0258832 A1* | 10/2011 | Ly ........................... | F21V 17/16 29/505 |
| 2012/0206917 A1* | 8/2012 | Burkard ................ | F21V 17/164 362/249.01 |

* cited by examiner

*Primary Examiner* — Sean P Gramling
(74) *Attorney, Agent, or Firm* — Stinson LLP

(57) ABSTRACT

The present invention is directed to a light fixture assembly and a releasable fastener for use with a light fixture assembly. The light fixture assembly includes: a first light fixture component; a second light fixture component that includes an engagement surface and an aperture; and a releasable fastener configured to extend through the aperture and engage the engagement surface when in the locked position to releasably secure the first and second light fixture components together.

26 Claims, 11 Drawing Sheets

LIGHT FIXTURE ASSEMBLY AND RELEASABLE FASTENER THEREFOR

CROSS-REFERENCE TO RELATED APPLICATIONS

Not applicable.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present invention relates to the field of light fixture assemblies, and is more specifically directed to a light fixture assembly with a releasable fastener and to a releasable fastener suitable for releasably securing light fixture components together.

2. Description of Related Art

Light fixture assemblies typically include a housing and lens that are connected to one another. Various means have been used in the past to connect the housing and lens together. While these prior means are useful to varying degrees, the present invention is an improvement that enables the lens and housing to be easily connected to one another and taken apart for maintenance and cleaning.

BRIEF SUMMARY OF THE INVENTION

In one aspect, the present invention is directed to a light fixture assembly. The light fixture assembly includes: a first light fixture component; a second light fixture component that includes an engagement surface and an aperture positioned adjacent the engagement surface; and a releasable fastener configured to extend through the aperture and engage the engagement surface when in a locked position to releasably secure the first and second light fixture components together. The releasable fastener includes a base, an elongated body extending from the base, and an engagement element extending outward from the elongated body. At least a portion of the base is formed integrally with the first light fixture component or configured to abuttingly engage at least a portion of the first light fixture component such that movement of the base in a direction toward the second light fixture is blocked when in the locked position. At least a portion of the elongated body is configured to be positioned within the aperture of the second light fixture and at least a portion of the engagement element is configured to engage with the engagement surface of the second light fixture component when in the locked position to releasably secure the first and second light fixture components together. In certain embodiments, the engagement element is in abutting engagement with the engagement surface when in the locked position such that movement of the engagement element in a direction toward the first light fixture component is blocked.

In some embodiments, at least a portion of the engagement surface of the second light fixture component extends at a generally right angle or generally acute angle to the longitudinal axis of the aperture in the second light fixture component. In certain embodiments, the aperture of the second light fixture component is defined by an aperture wall and at least a portion of the elongated body is configured to abuttingly contact at least a portion of the aperture wall when in the locked position. In certain embodiments, at least a portion of the elongated body is configured to abuttingly contact the entirety of the aperture wall when in the locked position. In certain embodiments, the engagement surface, aperture and releasable fastener are configured such that the releasable fastener can be positioned through the aperture and into engagement with the engagement surface in only one orientation.

In one embodiment of the invention, the light fixture assembly includes: a first light fixture component that includes a first engagement surface and a first aperture adjacent the first engagement surface; a second light fixture component that includes a second engagement surface and a second aperture adjacent the second engagement surface; and a releasable fastener configured to releasably secure the first and second light fixture components together when in the locked position. The releasable fastener includes an elongated body extending from a first end to a second end, a base proximal the first end, and an engagement element extending outward from the elongated body proximal the second end. At least a portion of the base is configured to abuttingly engage with the first engagement surface when in the locked position so as to as block movement of the base toward the second light fixture component; at least a portion of the elongated body is configured to be positioned within the first and second apertures; and at least a portion of the engagement element is configured to abuttingly engage with the second engagement surface when in the locked position so as to block movement of the engagement element toward the first light fixture component. In certain embodiments, the first engagement surface extends along an exterior surface of the first light fixture component facing away from the second light fixture component, and the second engagement surface extends along an exterior surface of the second light fixture component facing away from the first light fixture component. In certain embodiments the first and/or second engagement surfaces extend at a generally right angle or generally acute angle respectively to the longitudinal axis of the first and/or second apertures.

In certain embodiments, the first aperture is defined by a first aperture wall and the second aperture is defined by a second aperture wall, wherein the aperture walls are configured to correspond in shape with at least a portion of the elongated body such that the entirety of the aperture walls are in abutting contact with at least a portion of the elongated body. In certain embodiments, the engagement surfaces, apertures and releasable fastener are configured such that the releasable fastener can be positioned through the apertures and into engagement with the engagement surfaces in only one orientation.

In certain embodiments, the first and second apertures are configured to be aligned along the same longitudinal axis when in the locked position. In certain embodiments, the engagement element extends outward from one side of the elongated body for engagement with the second engagement surface adjacent one side of the aligned first and second apertures; and the base includes a tail extending outward from an opposite side of the elongated body for engagement with the first engagement surface adjacent the opposite side of the aligned first and second apertures.

In certain embodiments, a notch formed in the exterior surface of the first light fixture component defines the first engagement surface. In certain embodiments, at least a portion of the exterior surface of the base of the fastener lies flush with the exterior surface of the first light fixture component when the releasable fastener is in the locked position. In certain embodiments, a notch formed in the exterior surface of the second light fixture component defines the second engagement surface. In certain embodiments, the notch formed in the exterior surface of the second light fixture component is sized to accommodate external access to the engagement element in order to release the engagement element from abutting engagement with the second engagement surface and/or move the fastener to the unlocked position.

In certain embodiments, the first and second light fixture components are releasably secured together with the releasable fastener when: at least a portion of the base abuttingly engages the first engagement surface; at least a portion of the elongated body is positioned within the first and second apertures; and the engagement element abuttingly engages with the second engagement surface. Preferably, when the first light fixture component is releasably secured to the second light fixture component with the releasable fastener, the releasable fastener is moveable between the locked position, in which the engagement element engages the second engagement surface, and the unlocked position, in which the engagement element does not engage the second engagement surface.

In certain embodiments, the elongated body includes a flexible wall and a central opening, and the engagement element is positioned on flexible wall. Preferably, the flexible wall is flexed towards the central opening to move the fastener from the locked position to an unlocked position.

In certain embodiments, the releasable fastener is formed from a resilient material. Suitable resilient materials include, but are not limited to, polymeric materials, rubber, stainless steel and spring steel. Suitable polymeric materials include moldable thermoplastic materials such as acetal (POM) homopolymer, acrylonitrile butadiene styrene (ABS), polycarbonate (PC), nylon and flexible thermoplastics.

In certain embodiments, the releasable fastener is a single unitary component. In certain embodiments, the releasable fastener is a separate component that is not formed integrally with either the first or the second light fixture component. In other embodiments, the releasable fastener is formed integrally with the first light fixture component.

In certain embodiments, the first engagement surface is a clip-engaging surface, and the engagement element is a clip.

In certain embodiments, the first aperture and first engagement surface are positioned along an outer perimeter of the first component, and the second aperture and second engagement surface are positioned along an outer perimeter of the second component.

In certain embodiments, the first light fixture component is a housing, and the second light fixture is a lens. In other embodiments, the first light fixture component is a lens, and the second light fixture component is a housing.

In another aspect, the present invention is directed to a releasable fastener configured for releasably securing first and second light fixture components together. In certain embodiments, the releasable fastener is a single unitary component. The releasable fastener includes an elongated body extending from a first end to a second end; a base proximal the second end; and an engagement element extending outward from the elongated body proximal the second end. The releasable fastener is configured to be inserted through apertures in the first and second light fixture components with a portion of the base positioned outside of the apertures and engaging a portion of the first light fixture component, and with a portion of the engagement element positioned outside of the apertures and engaging a portion of the second light fixture component when in the locked position. When in this locked position, the first and second engagement surfaces block movement of the base and engagement element respectively so as to prevent movement of the fastener and secure the light fixture components together.

In certain embodiments, a portion of the base extends outwardly from the elongated body at a generally right angle or generally acute angle. In certain embodiments, a portion of the engagement element extends outwardly form the elongated body at a generally right angle or generally acute angle. In certain embodiments, a portion of the base extends outwardly from the elongated body along one side of the elongated body and at least a portion of the engagement element extends outwardly from the elongated body along an opposite side of the elongated body.

In certain embodiments, the elongated body includes a flexible wall and an opening, and the engagement element is positioned on the flexible wall. Preferably, the flexible wall is configured to flex towards the opening to move the releasable fastener from the locked to the unlocked position.

In certain embodiments, the releasable fastener is formed from a resilient material. Suitable resilient materials include, but are not limited to, polymeric materials, rubber, stainless steel and spring steel. Suitable polymeric materials include moldable thermoplastic materials such as acetal (POM) homopolymer, acrylonitrile butadiene styrene (ABS), polycarbonate (PC), nylon and flexible thermoplastics.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The invention will now be described with respect to the exemplary embodiments depicted in the figures, but is not limited to such embodiments.

In one aspect, the invention is directed to a light fixture assembly 10. An exemplary embodiment of light fixture assembly 10 and components thereof are depicted in the accompanying figures. Referring to FIGS. 1-7, light fixture assembly 10 includes translucent lens 12 releasably secured to housing 14 via a plurality of identical releasable fasteners 16.

Figure 1:
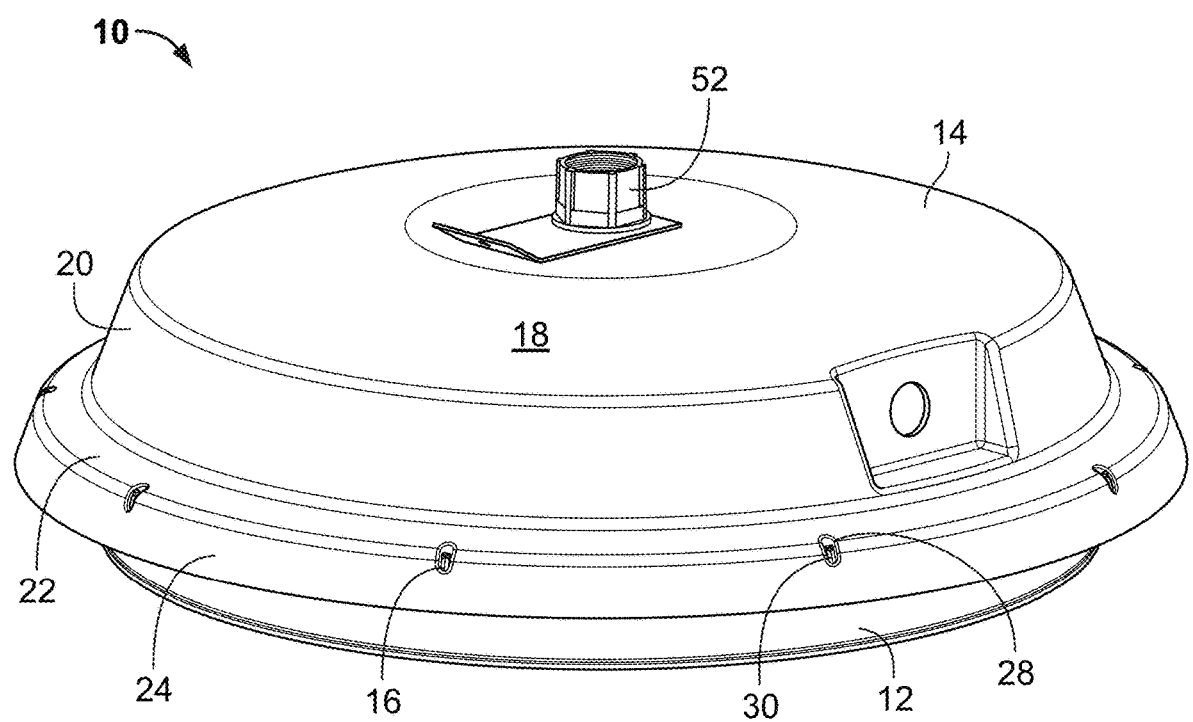
FIG. 1 is a perspective view of an exemplary light fixture assembly of the present invention.
Figure 2:
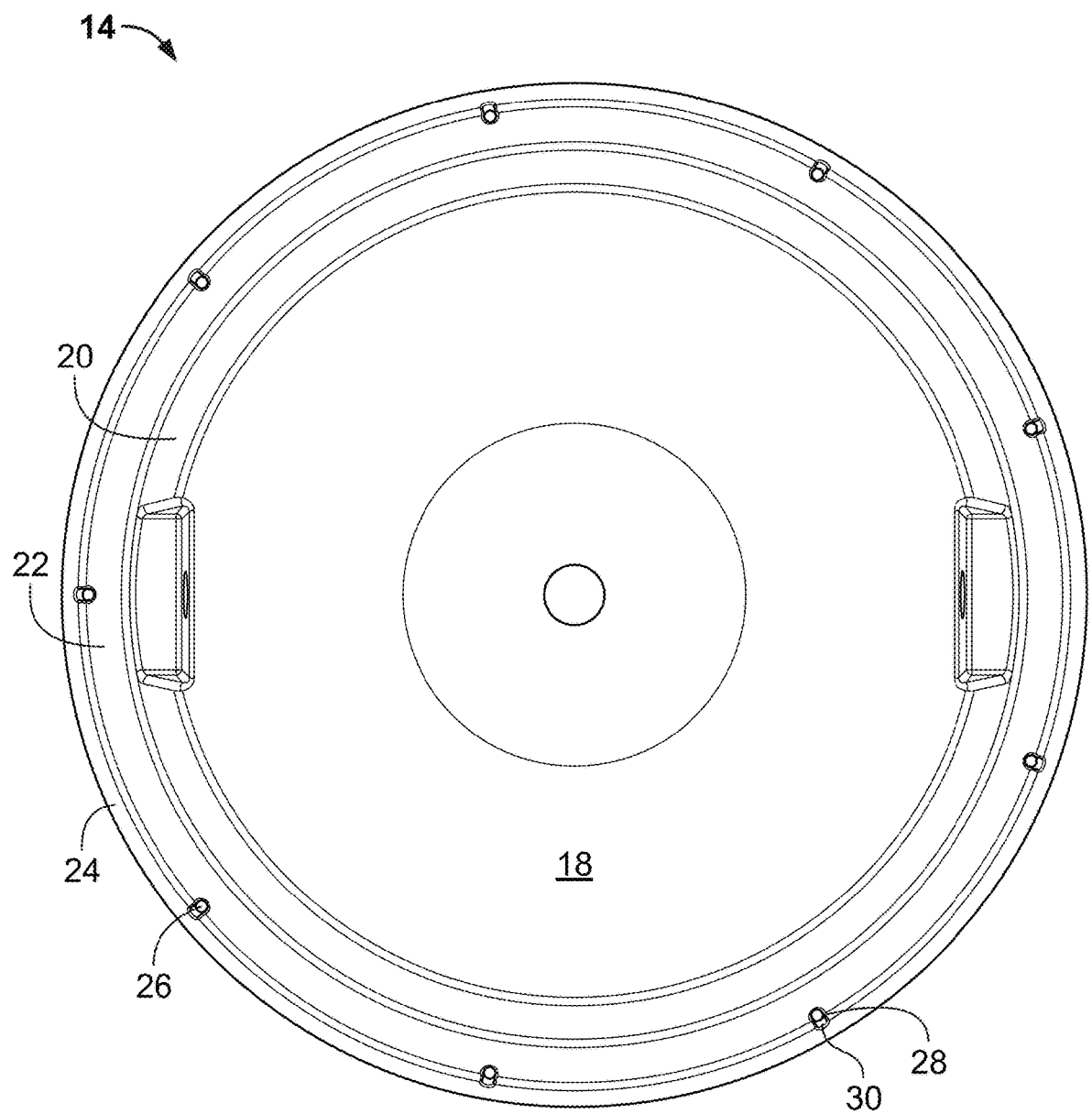
FIG. 2 is a top-plan view of the housing of the light fixture assembly of FIG. 1.
Figure 5:
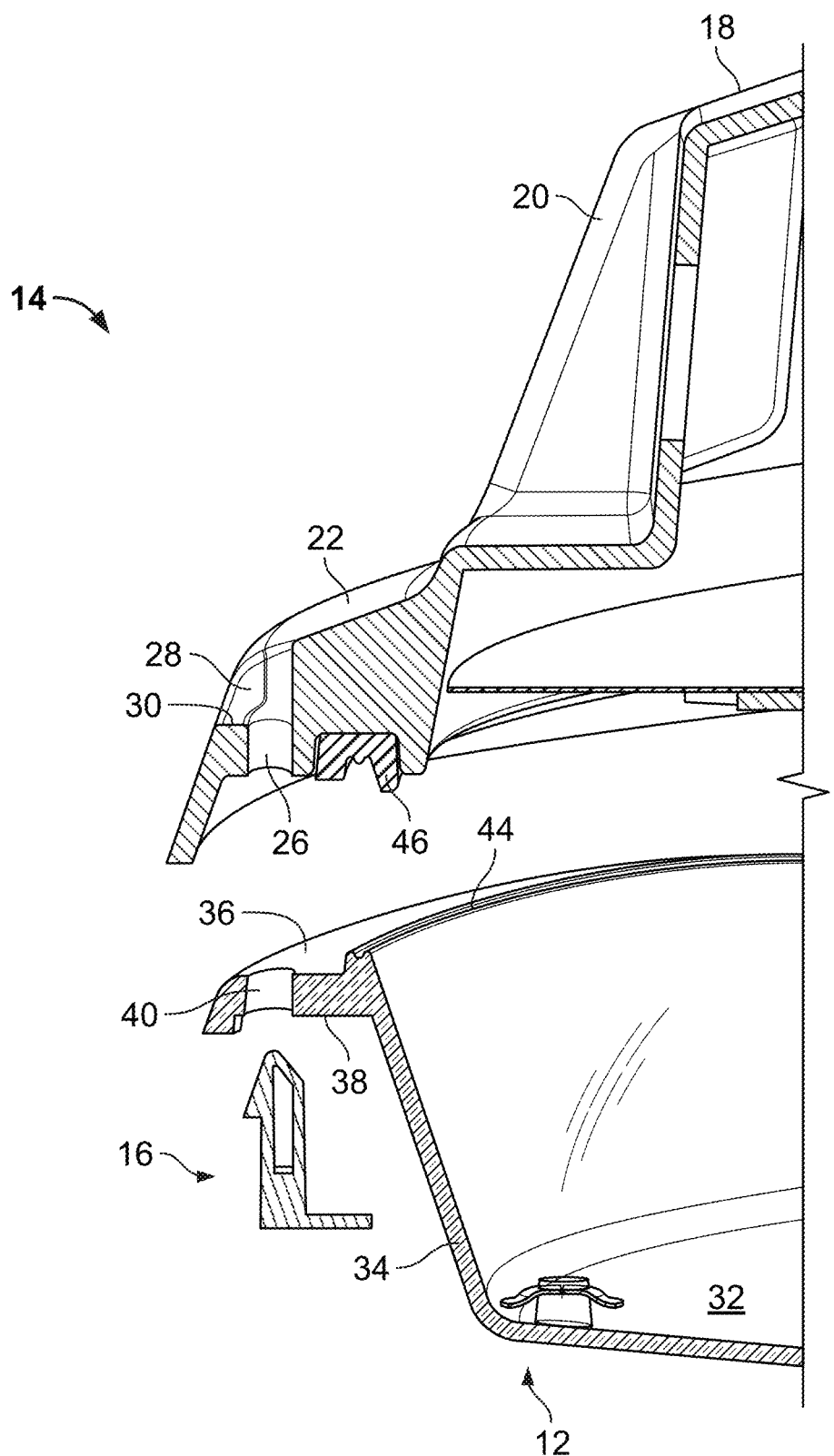
FIG. 5 is a fragmented cross-sectional exploded view of the light fixture assembly of FIG. 1 taken along line 6-6 shown in FIG. 4.

As best shown in FIGS. 1, 2 and 5, housing 14 has a round body with a closed top 18, a peripheral sidewall 20 extending downward from the top, a peripheral rim 22 extending outward from the bottom of sidewall 20, and a peripheral skirt 24 extending downward from rim 22. A plurality of identical housing apertures 26 (FIGS. 2 and 5) extending transversely or vertically through rim 22 are equally spaced apart and positioned along the outer perimeter of housing 14. Identical notches 28 (FIGS. 1 and 2) in the upper or exterior surface of rim 22 and skirt 24 adjacent each housing aperture 26 define identical horizontal shelves 30. As discussed hereinafter, each shelf 30 provides an engagement surface against which a portion of fastener 16 can engage to lock the housing and lens together.

Figure 3:
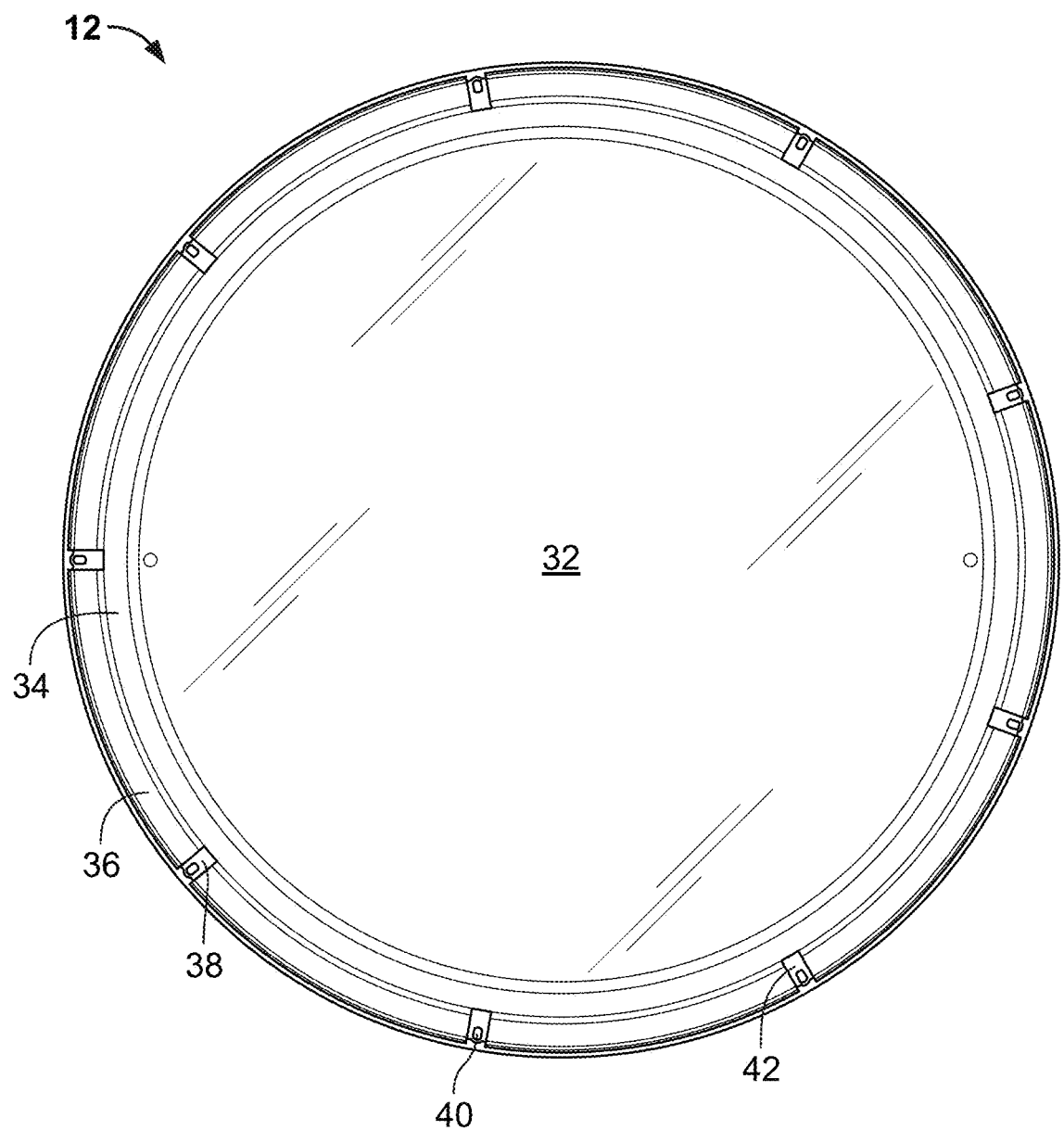
FIG. 3 is a bottom-plan view of the lens of the light fixture assembly of FIG. 1.

As best shown in FIG. 5, bowl-shaped lens 12 has a closed bottom 32 with a peripheral sidewall 34 extending upward from bottom 32, and a peripheral rim 36 extending horizontally outward from the top of sidewall 34. A plurality of identical lens apertures 40 extending transversely or vertically through rim 36 are equally spaced apart and positioned along the outer perimeter of lens 12 (FIGS. 3 and 5). Identical rectangular notches 42 (FIG. 3) in the bottom or exterior surface of rim 36 adjacent each lens aperture 40 defines an engagement surface 38 surrounding the aperture against which a portion of fastener engages when the housing and lens are releasably secured together.

Figure 6:
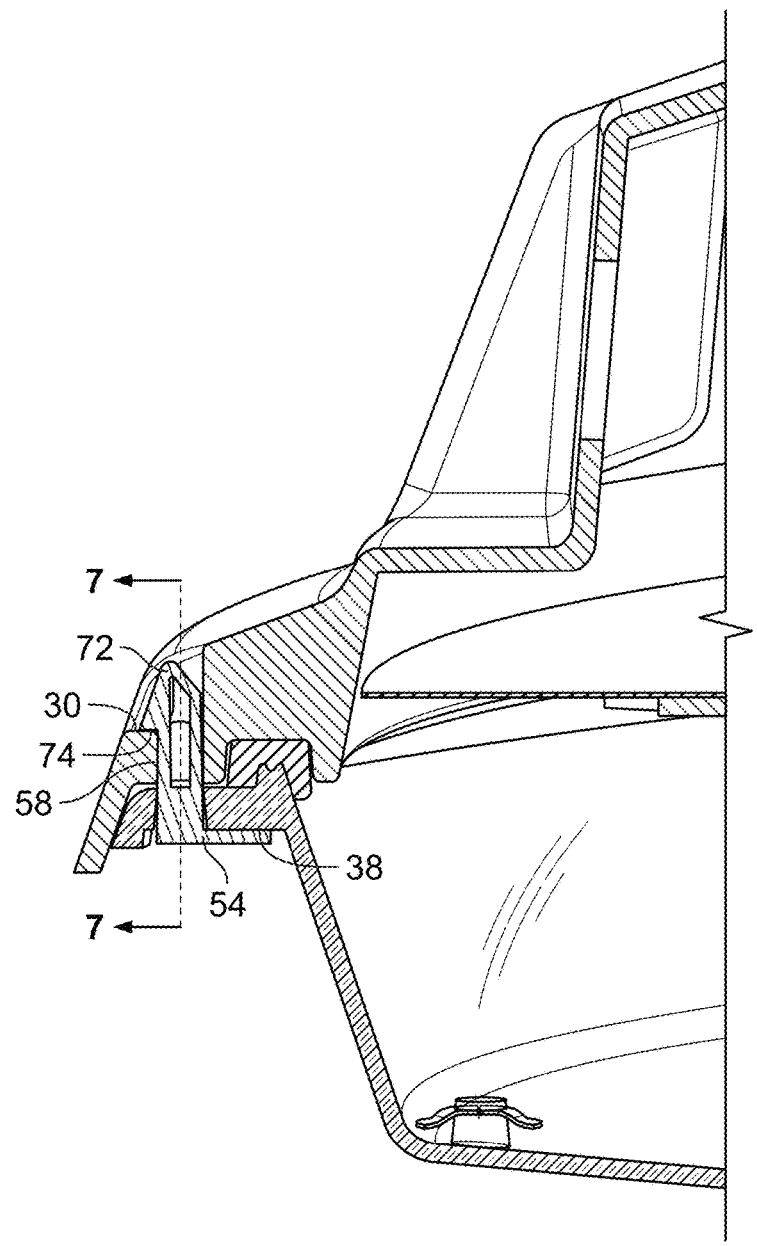
FIG. 6 is a fragmented cross-sectional view of the light fixture assembly of FIG. 1 taken along line 6-6 shown in FIG. 4 in which an exemplary releasable fastener of the present invention is positioned within aligned apertures of the lens and housing and is in the locked position.

Referring to FIGS. 5 and 6, a pair of circumferential ribs 44 extending upward from the top of sidewall 34 and a pair of corresponding channels in circumferential gasket 46 serve as male and female alignment guides respectively to assist in positioning the lens and housing when joining them together.

Figure 4:
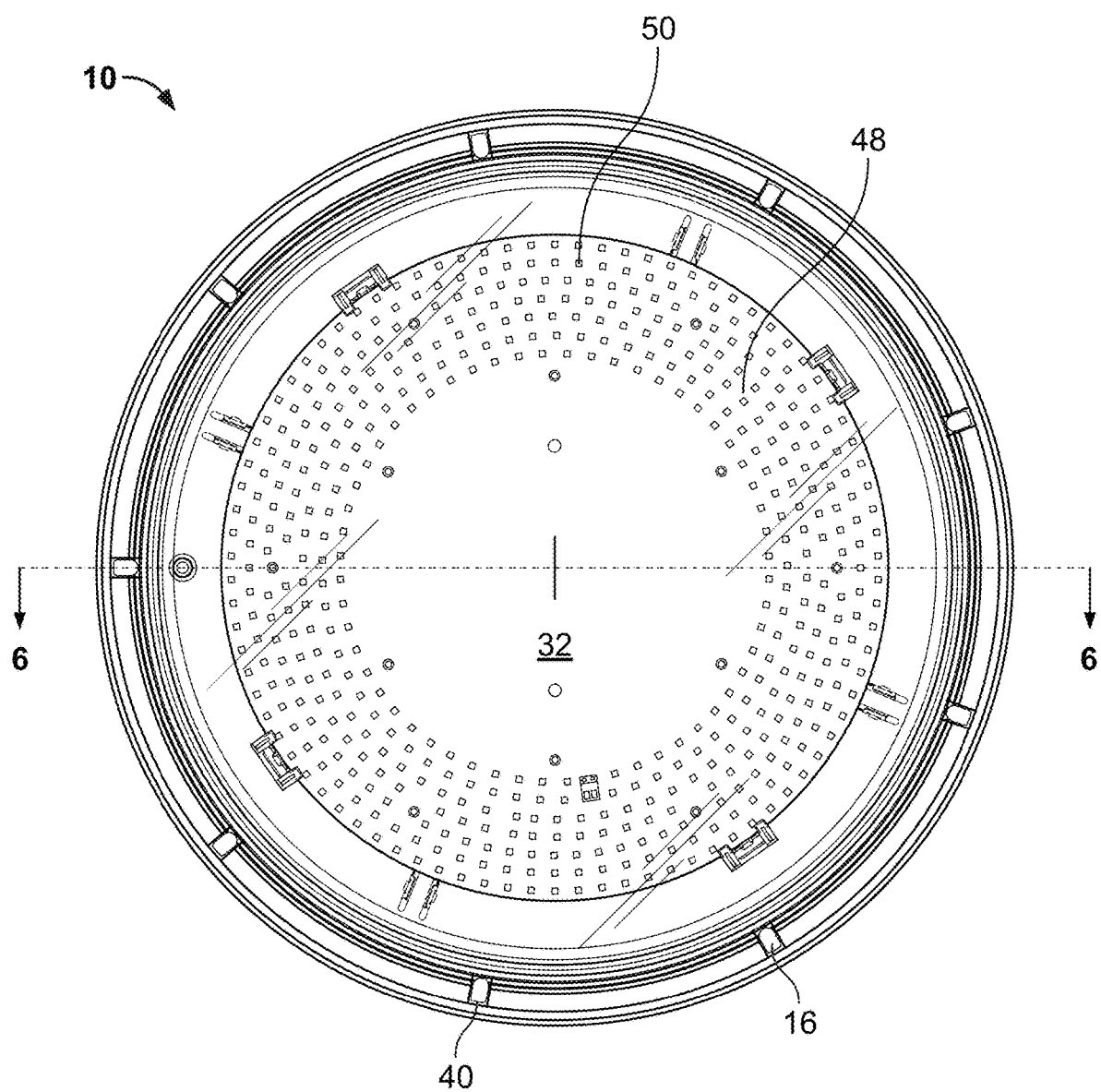
FIG. 4 is a bottom-plan view of the light fixture assembly of FIG. 1.

As shown in FIG. 4, light engine 48 with a plurality of light-emitting diode (LED) lamps 50 is attached to a bottom or interior surface of housing 14 and positioned within a lighting space defined by lens 12 and housing 14 when joined together. Although shown with an LED circular light engine 48, any suitable light source may be used, including but not limited to fluorescent, halogen, or incandescent bulbs.

Referring back to FIG. 1, housing 14 includes a mount 52 to attach the housing to a surface such as a ceiling and through which wiring (not shown) may be positioned within and connected to light engine 48 in order to connect light engine 48 to an external power source. When lens 12 is releasably secured to housing 14 with releasable fasteners 16, lens 12 protects light engine 48 from the elements and physical damage, and it may optionally serve to manipulate the direction and/or amount of light emitted from light engine 48. In the event that light engine 48, lens 12, and/or housing 14 need to be replaced, repaired, and/or cleaned, releasable fasteners 16 are operable to disengage or unlock lens 12 from housing 14. Lens 12 may then be rejoined to housing 14 with releasable fasteners 16. As discussed hereafter, no tools are required to operate releasable fasteners 16 when either releasably securing lens 12 to housing 14 or removing lens 12 from housing 14. In addition, releasable fastener is a unitary component that can be inserted into the locked position in only one orientation so as to make it relatively simple to secure the components together and take them apart.

Looking now to FIGS. 5-12, the configuration and functionality of the releasable fasteners 16 are described more fully with reference to a single fastener and associated portions of the lens 12 and housing 14. It should be understood that the lighting assembly includes a plurality of identical fasteners 16 and associated portions of the lens and housing. As best seen in FIG. 5, housing aperture 26 and lens aperture 40 are configured to align along the same longitudinal axis and overlap with one another such that a portion of releasable fastener 16 may be positioned within the apertures when lens 12 and housing 14 are removably secured to one another.

Figure 7:
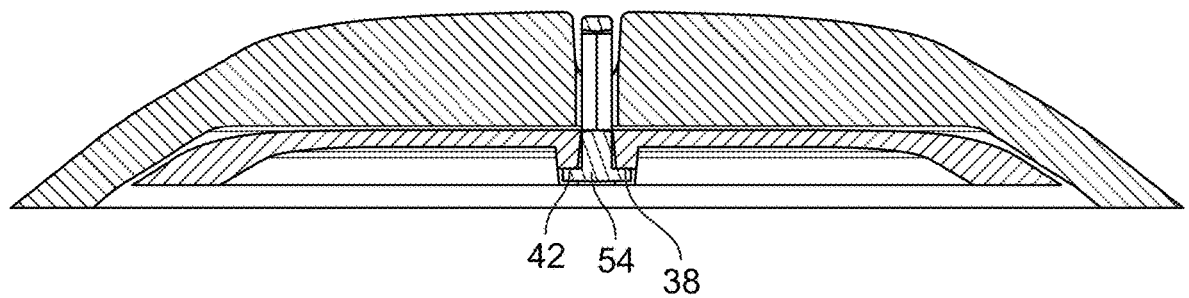
FIG. 7 is a fragmented cross-sectional view of the light fixture assembly of FIG. 1 taken along the line 7-7 shown in FIG. 6.
Figure 8:
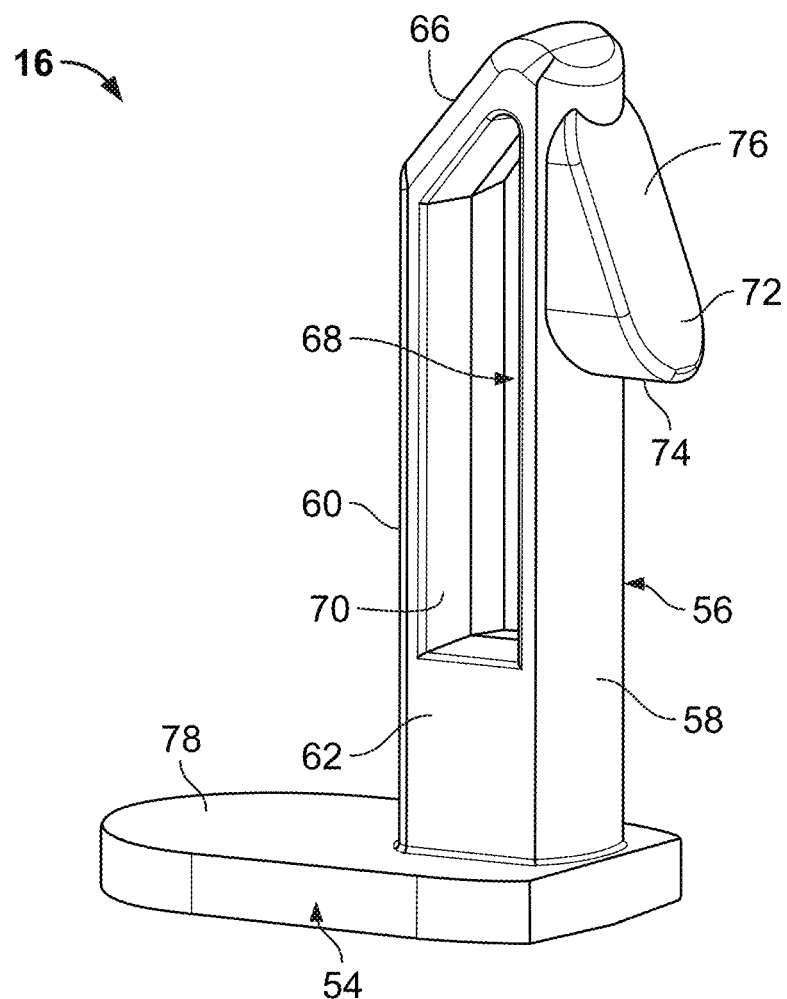
FIG. 8 is a perspective view of the exemplary releasable fastener shown in FIG. 6.
Figure 9:
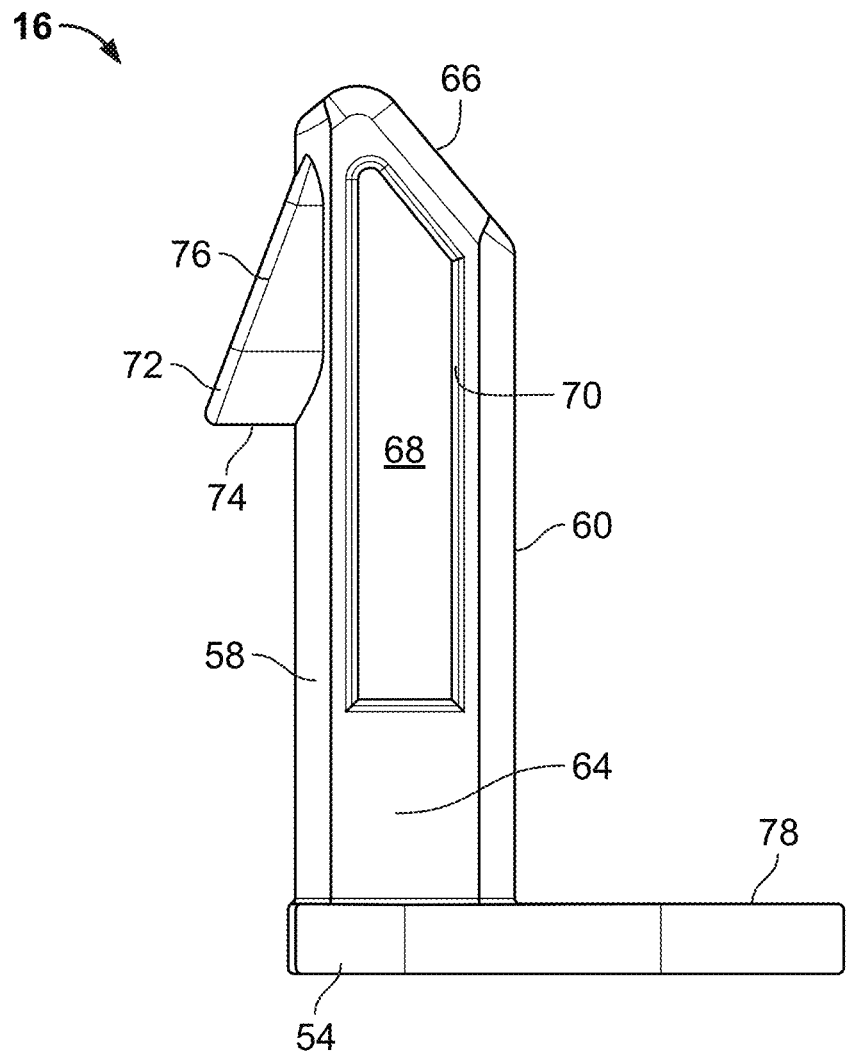
FIG. 9 is a side view of the exemplary releasable fastener of FIG. 8.

Looking to FIGS. 8 and 9, releasable fastener 16 includes a rounded rectangular horizontally oriented base 54 and an elongated body 56 extending vertically upward from the base 54 at a generally right angle or perpendicular the base. The top surface of base 54 surrounds the bottom of the elongated body and extends a distance from one side of the elongated body toward the central axis of the assembly to form a tail 78. The thickness of base 54 (i.e. the distance between top and bottom surfaces of base 54) is uniform and the top and bottom surfaces are generally planar in the embodiment depicted, but it should be understood that the thickness and configuration of the top and bottom surfaces may vary to correspond with other features of the lens as long as at least a portion of the top surface of the base is configured to correspond with the engagement surface 38 on the bottom or exterior of the lens for abutting contact when the elongated body is positioned within apertures 40, 26 in the locked position. (See, e.g. FIGS. 6 and 7).

As seen in FIGS. 8 and 9, elongated body 56 includes convex outward and inward facing external walls 58, 60 and relatively flat or planar opposing side external walls 62, 64 extending generally parallel one another. Angled external wall 66 extends from a top edge of outward facing wall 58, sloping downwardly to a top edge of inward facing wall 60. An elongated opening 68 extends through a portion of opposing side external walls 62, 64 and is defined by a polygonal internal sidewall 70, corresponding portions of which extend generally parallel to outward facing, inward facing, and angled walls 58, 60, and 66 and base 54. Opening 68 extends from an area adjacent the top of elongated body 56 to an area remote from base 54 such that the overall length of opening 68 is about three-quarters the length of elongated body 56. It should be understood, however, that opening 68 could be positioned and sized differently along elongated body as long it is configured to enable outward facing wall 58 to flex inwardly as discussed hereafter.

Wedge-shaped clip 72 is positioned proximal the top of fastener 16 and extends outward from outward facing wall 58. The bottom of clip 72 includes generally rounded clip engagement surface 74 that extends generally horizontal or parallel to the longitudinal axis of base 54 and generally perpendicular to the longitudinal axis of walls 58, 60, 62, 64. Tab 76 extending from a position proximal a top edge of outward facing external wall 58 slopes outwardly at an angle and downwardly to the outer edge of clip engagement surface 74. Although fastener 16 is shown with clip 72, other engagement elements extending outwardly from body 56 are within the scope of the present invention, including but not limited to a bar, pin, hook, tab, wedge, catch, or similar type fastener. The fastener engagement element also may have a flexible component or be spring-biased.

In this embodiment, outward facing external wall 58 is configured to flex towards opening 68 when releasable fastener 16 is positioned within at least a portion of apertures 40, 26, but in an unlocked position. To assist with flexing, releasable fastener 16 is preferably formed from a resilient material. Suitable resilient materials include, but are not limited to, polymeric materials, rubber, stainless steel and spring steel. Suitable polymeric materials include moldable thermoplastic materials such as Tenac™ 4010, an acetal (POM) homopolymer manufactured by Asahi Kasei Corporation, acrylonitrile butadiene styrene (ABS), polycarbonate (PC), nylon and flexible thermoplastics.

Figure 10:
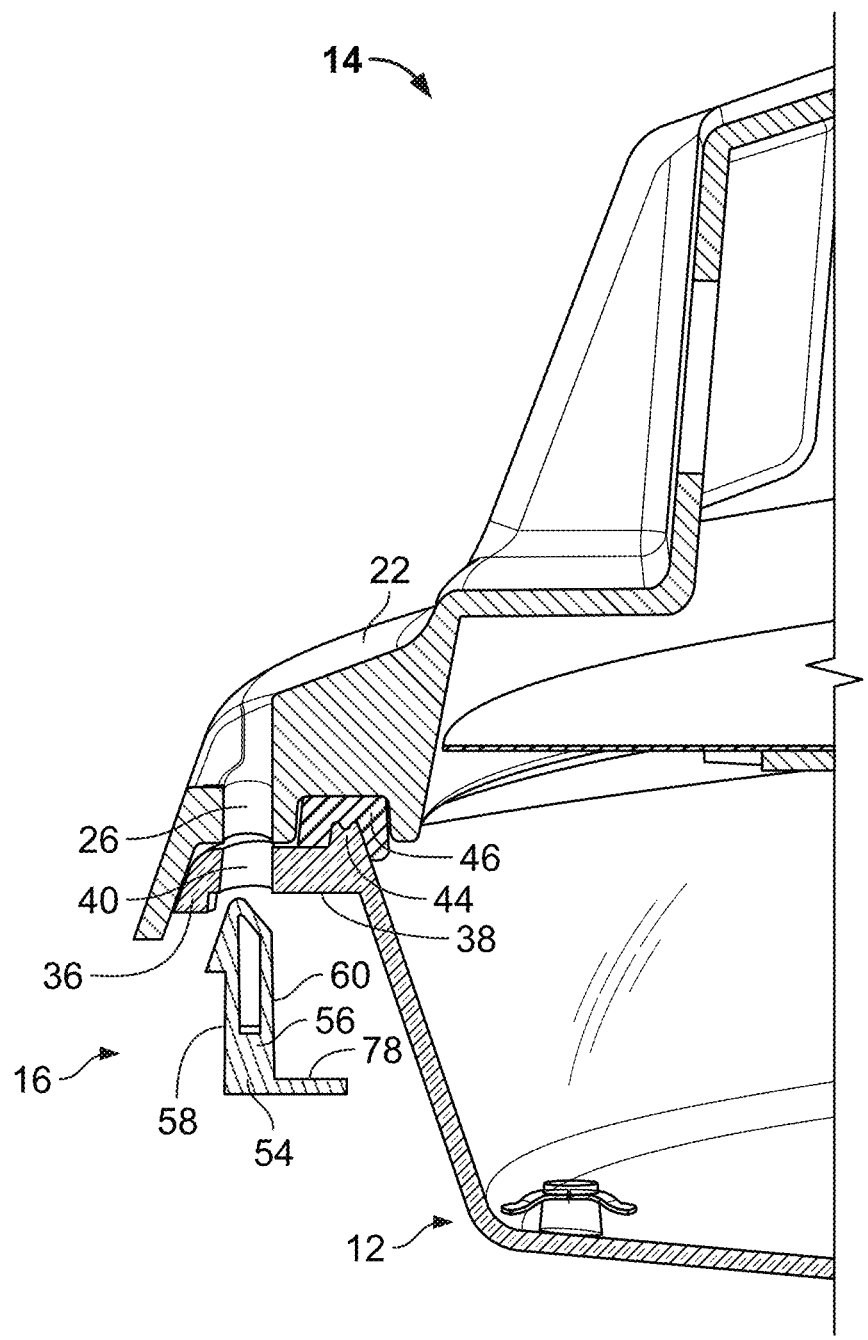
FIG. 10 is a fragmented cross-sectional view of the light fixture assembly of FIG. 1 taken along line 6-6 shown in FIG. 4 in which the exemplary releasable fastener is positioned outside of aligned apertures of the lens and housing.

Referring to FIG. 10, to releasably secure lens 12 to housing 14 with releasable fastener 16, elongated body 56 of releasable fastener 16, lens aperture 24, and housing aperture 26 are oriented and aligned as shown in FIG. 5. Flexible outward facing external wall 58 is positioned to face away from a shared central axis of lens 12 and housing 14, while inward facing external wall 60 is oriented to face towards a shared central axis of lens 12 and housing 14. The top surface of lens 12 is positioned against the bottom surface of housing rim 22 in order that ribs 44 are seated within the channels in gasket 46. In this position, it can be seen that engagement surface 38 surrounds aperture 40 and is configured to correspond in shape to the upper surface of base 54 such that engagement surface 38 abuttingly engages the upper surface of base 54 when fastener 16 is fully inserted into apertures 26, 40. Notably, notch 42 in the bottom or exterior surface of rim 36 extends a distance remote from aperture 40 toward the shared central axis of lens 12 and housing 14 to accommodate tail 78 of base 54. Elongated body 56 may then be inserted into the apertures 40, 26 via upward movement of releasable fastener 16. It is noted that lens and housing apertures 40, 26 correspond in size and shape to body 56 such that corresponding portions of external walls 58, 60, 62, 64 are in abutting contact with the walls of apertures 40, 26 when the fastener is in the locked position (FIG. 6).

Figure 11:
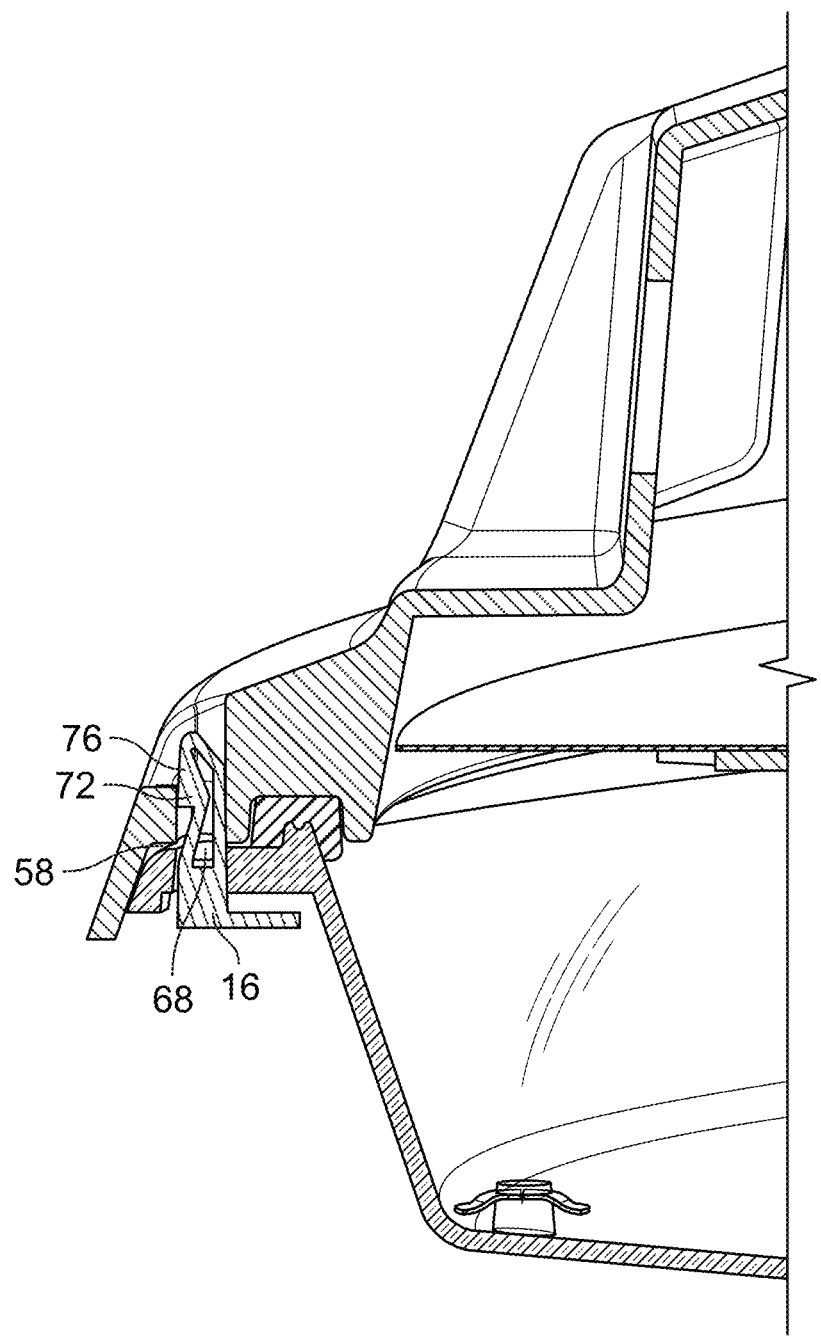
FIG. 11 is a fragmented cross-sectional view of the light fixture assembly of FIG. 1 taken along line 6-6 shown in FIG. 4 in which the exemplary releasable fastener is partially positioned within aligned apertures of the lens and housing.
Figure 12:
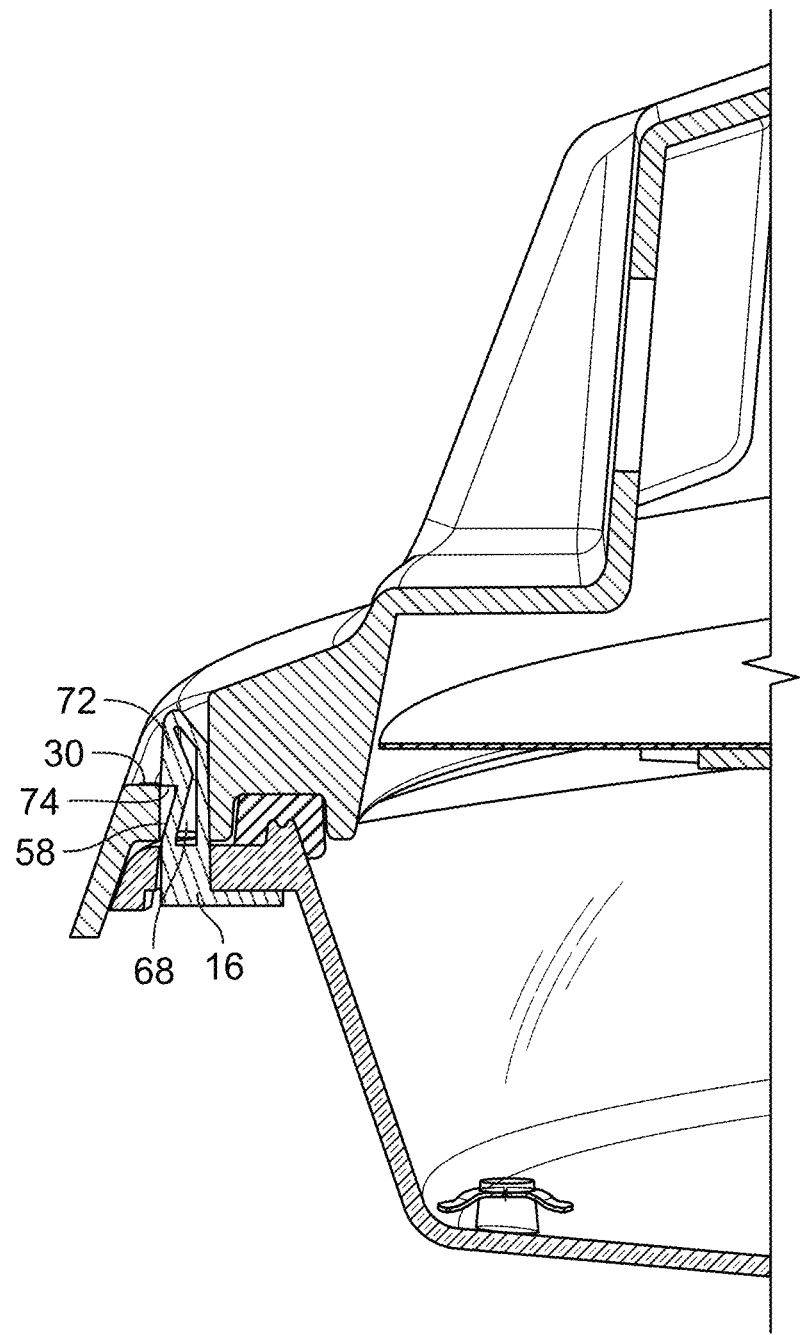
FIG. 12 is a fragmented cross-sectional view of the light fixture assembly of FIG. 1 taken along line 6-6 shown in FIG. 4 in which the exemplary releasable fastener is positioned within aligned apertures of the lens and housing and is in the unlocked position.

Referring to FIG. 11, as releasable fastener 16 is inserted into lens and housing apertures 40, 26, angled or ramped tab 76 of clip 72 contacts the front surface or sidewall of housing apertures 40, 26 as it moves upward. This contact causes inward movement of clip 72 and flexible external wall 58 towards opening 68, in turn causing opening 68 to contract or collapse. Referring to FIG. 12, once clip engagement surface 74 of clip 72 moves past the topmost outer edge of housing aperture 26, clip 72 and flexible external wall 58 are each momentarily in the position shown. As shown in FIG. 6, clip 72 and wall 58 then return or "snap" back to their natural position such that the fastener is in the locked position releasably securing the lens and housing together. In the locked position, clip engagement surface 74 extends outward beyond the housing aperture wall into abutting engagement with horizontally extending shelf 30 formed by notch 28 in the upper or exterior surface of rim 22. Shelf 30 creates a barrier to downward movement of the fastener 16 as long as the clip engagement surface is in abutting contact with the shelf 30. In the locked position, the top of base 54 is in abutting engagement with lens engagement surface 38 formed in the bottom or exterior surface of the lens 12 via notch 42. Lens engagement surface 38 creates a barrier to further upward movement of the fastener 16. As best shown in FIGS. 3, 6, and 7, notch 42 is sized and shaped to enable the top surface of base 54 to rest in abutting engagement with lens engagement surface 38 such that the bottom of base 54 is generally aligned flush with the bottom or exterior surface of the remainder of rim 36.

Referring to FIGS. 1 and 2, tab 76 of clip 72 is accessible through notch 28. Referring to FIG. 12, in order to remove releasable fastener 16 from light fixture assembly 10 and to separate lens 12 from housing 14, force is applied to tab 76 toward the shared central axis of lens 12 and housing 14 in order to move flexible external wall 58 and clip 72 carried thereon to the position shown, which in turn causes clip engagement surface 74 to move out of abutting engagement with shelf 30 such that releasable fastener 16 can be moved from the locked position to the unlocked position. Force may be applied to tab 76 with an operator's finger or any elongated object capable of applying sufficient force to push tab 76 inward. No tools are required and no screwing or removal of nuts or other securement means is required. Elongated body 56 of releasable fastener is then removed from lens and housing apertures 40, 26 via downward movement of releasable fastener 16. Once removed from lens and housing apertures 40, 26, clip 72 and flexible outward facing wall 58 return or "snap" back to their original positions.

The flexibility of elongated body 56 is improved due to the inclusion of opening 68, which in turn makes it possible to either position releasable fastener as shown in FIG. 6 to releasably secure lens 12 to housing 14 or to remove releasable fastener from the position shown in FIG. 6 in order to release lens 12 from housing 14.

Releasable fastener 16 as shown is a one-piece fastener that does not require a second component such as a nut or clasp to secure it in place. Releasable fastener also can be locked and unlocked with simple push and pull motions without the need for screwing or additional motions. Releasable fastener 16 is also configured to fit in only one orientation making it simple for users to insert. It cannot be positioned within lens and housing apertures 40, 26 in any orientation other than as shown in FIG. 6 and cannot be twisted once in the position shown. Releasable fastener 16 cannot be positioned within lens and housing apertures 24, 26 when rotated 180 degrees about a central axis of elongated body 56 for at least two reasons. First, as shown in FIG. 6, the inner top edge of the housing aperture sidewall (the edge positioned closer to the central axis of the housing) is positioned higher than an outer top edge of the housing aperture such that clip engagement surface 74 of releasable fastener cannot be positioned to engage with the inner top edge housing aperture sidewall. Second, contact between the tail 78 of base 54 and the bottom of the lens and housing rims would prevent complete insertion of elongated body 56 within lens and housing apertures 40, 26. As shown in FIGS. 3, 4, and 8, releasable fastener 16 also cannot be positioned within lens and housing apertures 40, 26 when rotated 90 degrees in either direction about a central axis of elongated body 56 due to the cross-sectional configuration of the aperture walls. As noted previously, the walls of apertures 40, 26 correspond in shape to that of the elongated body 56 of fastener 16. Specifically, the inward and outward facing walls of the apertures are generally rounded to correspond with convex walls 58, 60 of the elongated body and the opposing sidewalls of the apertures are generally straight or flat to correspond with flat opposing walls 62, 64 of the elongated body.

It should be understood that the releasable fastener 16 and light fixture assembly 10 of the present invention may be configured differently than as shown in the accompanying figures. For example, releasable fastener 16 and light fixture assembly 10 may be configured such that releasable fastener 16 releasably secures lens 12 to housing 14 in orientations different from the one shown. In one embodiment, clip engagement surface 74 of clip 72 may engage with a bottom portion of lens 12, while base 54 of releasable fastener may engage with a top portion of housing 14. In another embodiment, clip 72 may be positioned on inner wall 52 as opposed to outer wall 54 such that clip engagement surface 74 of clip 72 may engage with a top portion of housing 14 that is more proximal to a central axis of housing 14 than shelf 30. Regardless of the configurations of releasable fastener 16 and light fixture assembly 10, it is preferable that releasable fastener 16 be configured such that it can only be inserted into the locked position in one orientation. This makes it easier for the user to quickly assemble the assembly and reduces the possibility that lens 12 will be improperly or inadequately secured to housing 14.

As another example, in the embodiments shown, releasable fastener 16 is a separate component that is not formed integrally with either lens 12 or housing 14. However, it is anticipated that releasable fastener 16 may be formed integrally with one of the light fixture conmponents. For example, base 54 of releasable fastener 16 may be formed integrally with lens 12 so as to eliminate the need for lens apertures 24.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

The invention claimed is:

1. A light fixture assembly comprising:
    a first light fixture component comprising a first engagement surface and a first aperture adjacent the first engagement surface;
    a second light fixture component comprising a second engagement surface and a second aperture adjacent the second engagement surface;
    a releasable fastener configured to releasably secure the first and second light fixture components together when in a locked position;
    wherein the releasable fastener comprises a base proximal a first end of the fastener, an elongated body extending from the base, and an engagement element proximal a second end of the fastener extending outward from the elongated body when in its natural state, wherein the engagement element is configured to temporarily flex inward toward a central axis of the elongated body to enable the engagement element to be inserted through the first and second apertures and to return to its natural state when outside the first and second apertures;
    wherein at least a portion of the elongated body is configured to be positioned within the first and second apertures when in the locked position;
    wherein the engagement element is configured to abuttingly engage with the second engagement surface when in the locked position so as to block movement of the engagement element toward the first light fixture component; and
    wherein a notch formed in an exterior surface of the first light fixture component defines the first engagement surface and at least a portion of an exterior surface of the base lies flush with the exterior surface of the first light fixture component when the first and second light fixture components are releasably secured together by the releasable fastener.

2. The light fixture assembly of claim 1, wherein the first and second light fixture components are releasably secured together with the releasable fastener when: at least a portion of the base abuttingly engages the first engagement surface; at least a portion of the elongated body is positioned within the first and second apertures; and the engagement element abuttingly engages with the second engagement surface.

3. The light fixture assembly of claim 1, wherein when the first light fixture component is releasably secured to the second light fixture component with the releasable fastener, the releasable fastener is moveable between the locked position, in which the engagement element engages the second engagement surface, and an unlocked position, in which the engagement element does not engage the second engagement surface.

4. The light fixture assembly of claim 1, wherein the elongated body comprises a flexible wall and a central opening, and wherein the engagement element is positioned on the flexible wall.

5. The light fixture assembly of claim 4, wherein the flexible wall is flexed towards the central opening when the engagement element is being inserted through the first and second apertures.

6. The light fixture assembly of claim 1, wherein the first aperture is defined by a first aperture wall and the second aperture is defined by a second aperture wall, wherein the aperture walls are configured to correspond in shape with at least a portion of the elongated body such that the entirety of the aperture walls are in abutting contact with at least a portion of the elongated body.

7. The light fixture assembly of claim 1, wherein the first and second engagement surfaces, first and second apertures and releasable fastener are configured such that the releasable fastener can be positioned through the first and second apertures and into engagement with the first and second engagement surfaces in only one orientation.

8. The light fixture assembly of claim 1, wherein the first and second apertures are configured to be aligned along the same longitudinal axis when in the locked position.

9. The light fixture assembly of claim 8, wherein the engagement element extends outward from one side of the elongated body for engagement with the second engagement surface adjacent a first side of the first and second apertures; and the base includes a tail extending outward from an opposite side of the elongated body for engagement with the first engagement surface adjacent a side of the first and second apertures opposite that of the first side.

10. The light fixture assembly of claim 1, wherein a notch formed in an exterior surface of the second light fixture component defines the second engagement surface and is sized to accommodate external access to the engagement element in order to release the engagement element from abutting engagement with the second engagement surface.

11. The light fixture assembly of claim 1, wherein the releasable fastener is a single component.

12. The light fixture assembly of claim 1, wherein the first light fixture component is a housing, and the second light fixture component is a lens.

13. The light fixture assembly of claim 1, wherein the first light fixture component is a lens, and the second light fixture component is a housing.

14. A light fixture assembly comprising:
- a first light fixture component comprising a first engagement surface and a first aperture adjacent the first engagement surface;
- a second light fixture component comprising a second engagement surface and a second aperture adjacent the second engagement surface;
- a releasable fastener configured to releasably secure the first and second light fixture components together when in a locked position;
- wherein the releasable fastener comprises a base proximal a first end of the fastener, an elongated body extending from the base, and an engagement element proximal a second end of the fastener extending outward from the elongated body when in its natural state, wherein the engagement element is configured to temporarily flex inward toward a central axis of the elongated body to enable the engagement element to be inserted through the first and second apertures and to return to its natural state when outside the first and second apertures;
- wherein at least a portion of the elongated body is configured to be positioned within the first and second apertures when in the locked position;
- wherein the engagement element is configured to abuttingly engage with the second engagement surface when in the locked position so as to block movement of the engagement element toward the first light fixture component; and
- wherein a notch formed in an exterior surface of the second light fixture component defines the second engagement surface and is sized to accommodate external access to the engagement element in order to release the engagement element from abutting engagement with the second engagement surface.

15. The light fixture assembly of claim 14, wherein the first and second light fixture components are releasably secured together with the releasable fastener when: at least a portion of the base abuttingly engages the first engagement surface; at least a portion of the elongated body is positioned within the first and second apertures; and the engagement element abuttingly engages with the second engagement surface.

16. The light fixture assembly of claim 14, wherein when the first light fixture component is releasably secured to the second light fixture component with the releasable fastener, the releasable fastener is moveable between the locked position, in which the engagement element engages the second engagement surface, and an unlocked position, in which the engagement element does not engage the second engagement surface.

17. The light fixture assembly of claim 14, wherein the elongated body comprises a flexible wall and a central opening, and wherein the engagement element is positioned on the flexible wall.

18. The light fixture assembly of claim 17, wherein the flexible wall is flexed towards the central opening when the engagement element is being inserted through the first and second apertures.

19. The light fixture assembly of claim 14, wherein the first aperture is defined by a first aperture wall and the second aperture is defined by a second aperture wall, wherein the aperture walls are configured to correspond in shape with at least a portion of the elongated body such that the entirety of the aperture walls are in abutting contact with at least a portion of the elongated body.

20. The light fixture assembly of claim 14, wherein the first and second engagement surfaces, first and second apertures and releasable fastener are configured such that the releasable fastener can be positioned through the first and second apertures and into engagement with the first and second engagement surfaces in only one orientation.

21. The light fixture assembly of claim 14, wherein the first and second apertures are configured to be aligned along the same longitudinal axis when in the locked position.

22. The light fixture assembly of claim 21, wherein the engagement element extends outward from one side of the elongated body for engagement with the second engagement surface adjacent a first side of the first and second apertures; and the base includes a tail extending outward from an opposite side of the elongated body for engagement with the first engagement surface adjacent a side of the first and second apertures opposite that of the first side.

23. The light fixture assembly of claim 22, wherein a notch formed in an exterior surface of the first light fixture component defines the first engagement surface and at least a portion of an exterior surface of the base lies flush with the exterior surface of the first light fixture component when the first and second light fixture components are releasably secured together by the releasable fastener.

24. The light fixture assembly of claim 14, wherein the releasable fastener is a single component.

25. The light fixture assembly of claim 14, wherein the first light fixture component is a housing, and the second light fixture component is a lens.

26. The light fixture assembly of claim 14, wherein the first light fixture component is a lens, and the second light fixture component is a housing.

* * * * *